(12) United States Patent
Neebe et al.

(10) Patent No.: US 8,284,060 B2
(45) Date of Patent: Oct. 9, 2012

(54) SYSTEM FOR MANAGING MAIL CARRIERS IN A SORTING FACILITY USING PERSISTENT ASSET ROUTING TERMINALS

(75) Inventors: Mark T. Neebe, Catonsville, MD (US); Paul J. Speese, Doylestown, PA (US); Randall Keith Neilson, Crownsville, MD (US)

(73) Assignee: Norththrop Grumman Systems Corporation, Falls Church, VA (US)

( * ) Notice: Subject to any disclaimer, the term of this patent is extended or adjusted under 35 U.S.C. 154(b) by 431 days.

(21) Appl. No.: 12/575,104

(22) Filed: Oct. 7, 2009

(65) Prior Publication Data

US 2011/0080281 A1 Apr. 7, 2011

(51) Int. Cl.
*G08B 13/14* (2006.01)
(52) U.S. Cl. .................. 340/572.1; 700/225
(58) Field of Classification Search ........... 340/572.1, 340/10.1; 700/214, 225, 228–230; 705/28; 235/385; 209/549
See application file for complete search history.

(56) References Cited

U.S. PATENT DOCUMENTS

| | | | |
|---|---|---|---|
| 6,501,041 B1* | 12/2002 | Burns et al. | 209/584 |
| 2006/0108266 A1* | 5/2006 | Bowers et al. | 700/224 |
| 2006/0206235 A1* | 9/2006 | Shakes et al. | 700/216 |
| 2007/0000990 A1* | 1/2007 | Baldassari et al. | 235/385 |
| 2007/0198175 A1* | 8/2007 | Williams et al. | 701/202 |
| 2007/0213869 A1* | 9/2007 | Bandringa et al. | 700/213 |

* cited by examiner

*Primary Examiner* — Thomas Mullen
(74) *Attorney, Agent, or Firm* — Rothwell, Figg, Ernst & Manbeck, P.C.

(57) ABSTRACT

A system for managing a plurality of carriers in a mail sorting facility includes a server configured to create, implement and/or execute a sort plan, a plurality of terminals disposed on the plurality of carriers and each configured to send a wireless beacon signal and at least one gateway in communication with the server and configured to receive the wireless beacon signals from the terminals. The terminals preferably each include an alert mechanism. Preferably, the server is further configured to determine the location of a terminal based on the beacon signal transmitted by the terminals to the servers via the at least one gateway and configured to compare the location of each terminal to the location required by the sort plan and to activate the alert mechanism in any terminal determined to be in an incorrect location.

16 Claims, 6 Drawing Sheets

SYSTEM FOR MANAGING MAIL CARRIERS IN A SORTING FACILITY USING PERSISTENT ASSET ROUTING TERMINALS

BACKGROUND OF THE INVENTION

I. Field of the Invention

The present invention relates generally to mail sorting systems and, more particularly, to a system for managing carriers in a mail sorting facility.

II. Discussion of Related Art

In automated mail sorting facilities, there are numerous stations that mail must pass through as part of the sorting process. For example, there may be stations for preparing incoming mail, sorting the mail and outputting the sorted mail. Modern mail sorting equipment is generally computer-controlled. The computer is programmed to execute one or more sort plans typically involving multiple passes through the mail sorting equipment.

Mail is transported between stations using carriers such as dollies and carts. The carriers are manually transported to the proper station by workers in the mail sorting facility. Hundreds of carriers can be in transport at any time. Numerous problems can arise during this chaotic transportation of carriers, such as carriers being missed or carriers being delivered to the wrong station.

SUMMARY OF THE INVENTION

The present invention addresses the needs of a modern mail sorting facility by monitoring the location of carriers in the facility and alerting personnel if the location of a carrier conflicts with a selected sort plan.

In accordance with a first aspect of the present invention, a system for managing a plurality of carriers in a mail sorting facility includes a server configured to create, implement and/or execute a sort plan, a plurality of terminals disposed on the plurality of carriers and each configured to send a wireless beacon signal and at least one gateway in communication with the server and configured to receive the wireless beacon signals from the terminals. The terminals preferably each include an alert mechanism. Preferably, the server is further configured to determine the location of a terminal based on the beacon signal transmitted by the terminals to said servers via said at least one gateway and configured to compare the location of each terminal to the location required by the sort plan and to activate the alert mechanism in any terminal determined to be in an incorrect location.

In an embodiment, the terminals each include a display system that displays information including at least one of carrier identification and sort plan information. In an embodiment, the sort plan information includes zip code of the mail in the carrier and/or the mail handling station the carrier must go to within the mail sorting facility. In an embodiment, the terminal is configured such that the display protrudes physically from the carrier when the terminal is attached thereto.

In an embodiment, the at least one gateway is configured to determine a signal strength of the beacon signal received from the terminal and to provide information about the signal strength to the server. The server is configured to determine the location of the terminal based on the signal strength of the beacon signal. In an embodiment, the server is configured to determine the location of the terminal using a plurality of received signal strength readings.

In an embodiment, the terminals each include a motion sensor. In an embodiment, each terminal is configured to send a beacon signal after a predetermined period with no motion. In an embodiment, each terminal is configured to continuously send beacon signals while in motion.

In an embodiment, the alert mechanism includes a light-emitting diode. In an embodiment, the alert mechanism is configured to activate in response to an alert signal from the server.

In an embodiment, the system further comprises a plurality of gateways in communication with the server and configured to receive the wireless beacon signals from the terminals. In an embodiment, a gateway is present at each mail loading or unloading station.

In an embodiment, the beacon signal includes carrier identification information.

In an embodiment, the at least one gateway is configured to write information to each terminal. In an embodiment, the information written to each terminal by the at least one gateway includes identification information. In an embodiment, the at least one gateway is configured to erase information on the terminal when the mail in the carrier said terminal is disposed to has been unloaded.

The present invention is advantageous in that it can organize the carriers in a mail sorting facility making it easier for workers to transport the carriers to the proper location at the proper time, and to check the location of the carriers en route to their destination to prevent errors.

These and other objects and advantages will be apparent to those of skill in the art upon review of the attached drawing figures and the following detailed description of the preferred embodiment of the invention.

DETAILED DESCRIPTION OF THE PREFERRED EMBODIMENT

Figure 1:
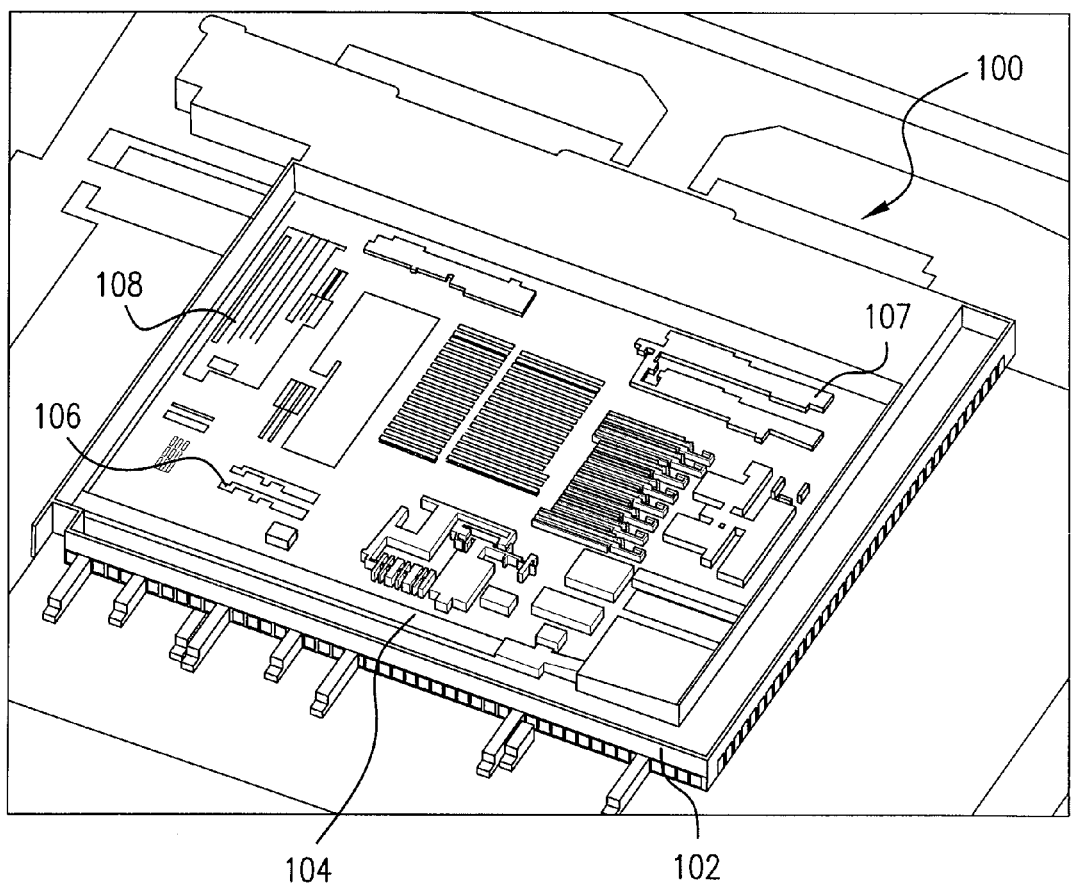
FIG. 1 is perspective view showing a mail sorting facility using a carrier management system according to an embodiment of the present invention.

FIG. 1 shows a typical mail sorting facility 100 of the type in which the system of the present invention can be used. The mail sorting facility 100 includes truck docks 102, automated bulk flats processors (BFPs) 104, manual tray loading stations 106, automated flats sorting machines (such as the "AFSM 100" automated flats sorting machine) 107, and flats sequencing systems (FSS) 108. The truck docks 102 are configured for mail to be loaded into the facility from trucks and for sorted mail to be loaded onto the trucks. The BFPs 104 process mail that has entered the facility. An example of a BFP that can be used according to an embodiment of the present invention is disclosed in co-pending U.S. patent application Ser. No. 12/266,000, filed on Nov. 6, 2008, which is incorporated herein by reference. The BFPs 104 include pallet unloading docks, a plurality of tray loading stations and a plurality of dolly loading docks. The BFPs 104 break down bundled or palletized mail and put the mail in automation compatible trays (trays that may be used in the flats sequencing system), such as the tray disclosed in U.S. patent application Ser. No. 10/927,542, filed on Aug. 27, 2004, now abandoned, which is incorporated herein by reference. The BFPs 104 place multiple automation compatible trays (ACT) onto a dolly or other type of mobile carrier. The mail that is not processed by the BFPs can be manually placed in ACTs at the manual tray loading stations and loaded onto carriers.

The carriers containing the ACTs are transported to the FSS 108. The FSS 108 includes dolly unloading docks, feeders, sorters, tray staging devices, and integrated tray converters. The FSS 108 sorts mail according to a criterion such as delivery route, zip code, town, state or country. The FSS 108 will sort mail until it is ready for dispatch. Alternatively, flats mail can be sorted using the AFSM 100 sorting machines 107. The dispatched mail is placed in dispatch trays. The dispatch trays are placed in carriers known as carrier automated street tray rack (CASTR) carts. The CASTR carts are loaded into trucks or delivery automobiles at the truck docks 102.

Figure 2:
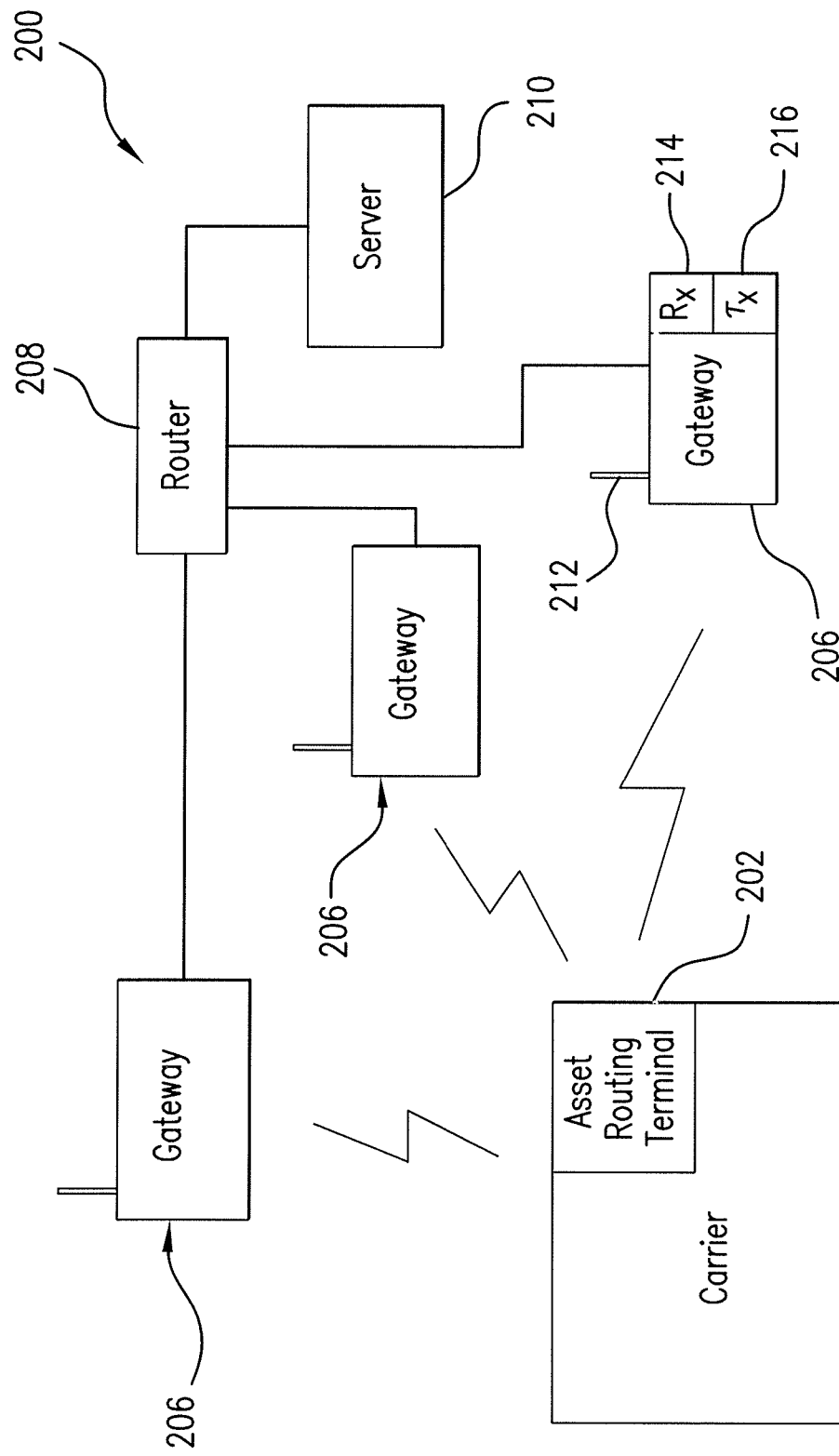
FIG. 2 is a block diagram of a mail carrier management system according to an embodiment of the present invention.

FIG. 2 is a block diagram showing an example of a mail carrier management system 200 according to an embodiment of the present invention. The system 200 includes an asset routing terminal 202 mounted on a carrier 204, a plurality of gateways 206, a router 208 and a server 210.

The asset routing terminal 202 is mounted on the carrier 204, which can be any structure or device capable of holding or storing mail, including, but not limited to, pallets, dollies, trays and carts. The asset routing terminal 202 is configured to be in wireless communication with at least one gateway 206. More specifically, the asset routing terminal 202 is configured to send a beacon signal containing information on the identity of the carrier 204 and the gateways 206 are configured to receive the beacon signal.

In an embodiment of the present invention, a plurality of gateways 206 are placed throughout the mail sorting facility 100. In an embodiment of the present invention, each gateway 206 includes an antenna 212 and a receiver circuit 214 configured to receive beacon signals and determine a received signal strength indication (RSSI), e.g. in accordance with the IEEE 802.11 wireless protocol. In an embodiment of the present invention, the gateway also includes a transmitter circuit 216 capable of broadcasting a wireless signal to the asset routing terminal.

In an embodiment of the present invention, the gateways 206 are connected to the server 210 via a router 208. In an embodiment of the present invention, the server 210 is configured to create, store, implement and/or execute a sort plan that specifies a location (or station) for each carrier 204 at a given time. In an embodiment, the server 210 is a general purpose computer with digital storage storing one or more sort plans that are preloaded onto the server 210 and selectable by a user via control software on the server. The server 210 is programmed to receive information regarding the beacon signals from the gateways 206. The server 210 is also configured to determine each location of the asset routing terminal 202 based on information received from the at least one gateway 206 via the router 208. In an embodiment of the present invention, the server 210 is also capable of communicating with the asset routing terminal 202 via the at least one gateway.

Figure 3:
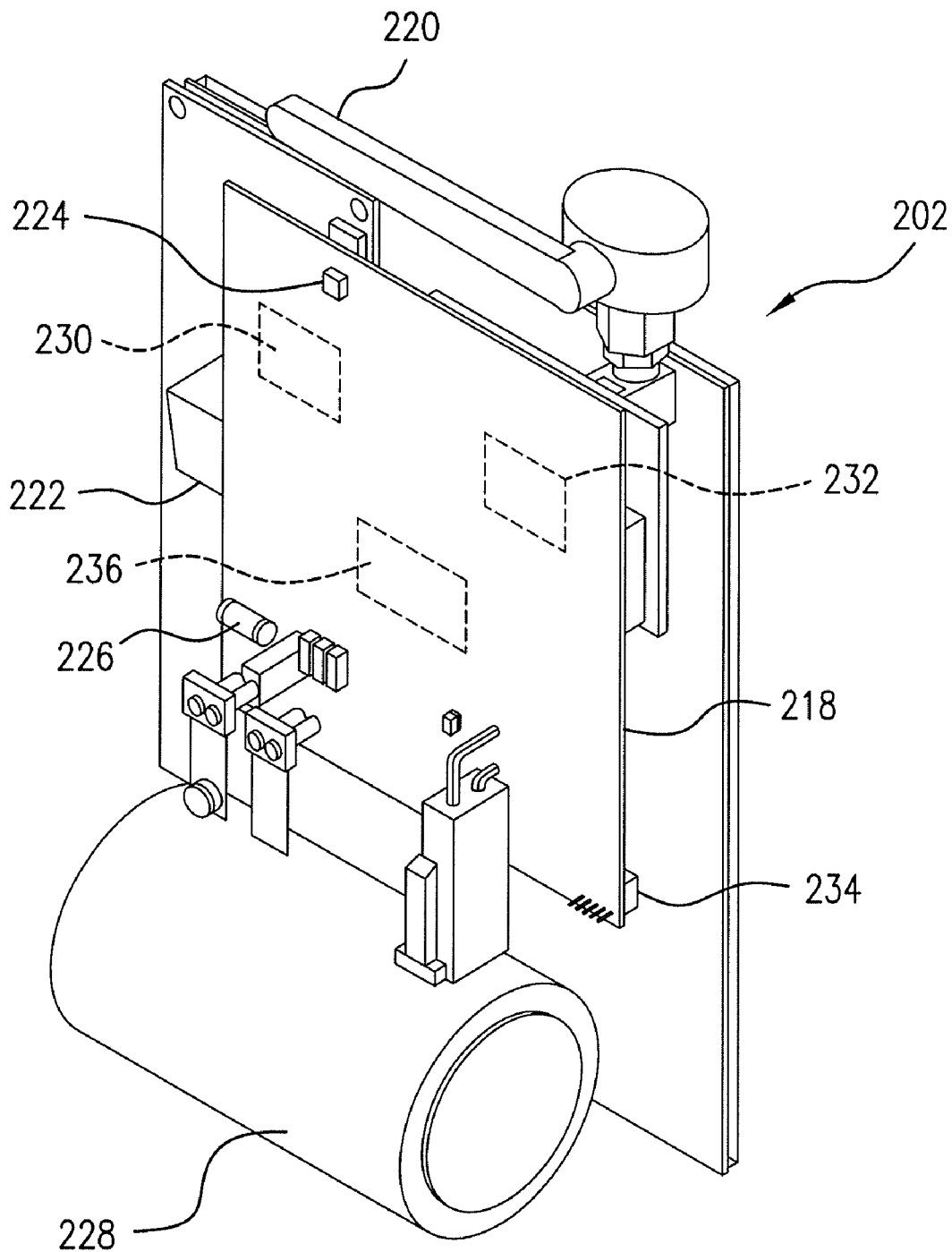
FIG. 3 is a perspective view showing the internal details of a terminal components according to an embodiment of the present invention.

FIG. 3 shows details of an asset routing terminal 202 according to an embodiment of the present invention. The asset routing terminal 202 includes a circuit board 218, an antenna 220, a display connector 222, an alert mechanism 224, a motion sensor 226, a battery 228 and a memory device 230. The circuit board includes an on/off switch 234 and a transmit circuit 232 configured to send a wireless beacon signal using the antenna 220 when the terminal is on. The beacon signal contains information such as carrier identification information. In an embodiment, the circuit board 218 also includes a receive circuit 236 configured to receive a wireless signal from the at least one gateway. In a preferred embodiment, the transmit and receive circuits are configured to broadcast and receive wireless signals using the IEEE wireless 802.15.4 standard at 900 mHz or 2.4 GHz, although other protocols and frequencies can be used.

The display connector 222 is configured to connect the display (FIG. 4) to the circuit board 218. In an embodiment, the connector 222 includes a ribbon cable that can wrap around the circuit board.

The alert mechanism 224 is configured to be detectable by personnel at the mail sorting facility 100. According to an embodiment of the present invention, the alert mechanism 224 includes a light emitting diode (LED) mounted on the circuit board 218 and connected to an alert circuit that causes the LED to emit light in response to an alert signal. In an alternative embodiment of the present invention, the alert mechanism 224 includes a sound emitting device such as a buzzer, bell or chime. In an alternative embodiment of the present invention, the alert mechanism 224 may include both sound and light emitting devices.

The motion sensor 226 is configured to detect when the asset routing terminal 202 is in motion. In a preferred embodiment, the asset routing terminal 202 is configured to transmit a beacon signal immediately upon sensing the terminal is in motion. In a preferred embodiment, the asset routing terminal 202 is configured to enter a sleep mode after a predetermined period at rest. The terminal preferably transmits a beacon signal including a request for instructions from the server at predetermined intervals (e.g., every 5 minutes or so) while the terminal is at rest. It will be appreciated that use of a motion sensor in this manner helps to conserve battery life by limiting transmissions to certain conditions, such as when the asset terminal is placed in motion or at rest for more than a predetermined period of time.

The memory device 230 is configured to hold information about the identity of the carrier upon which the asset routing terminal is mounted. In an embodiment of the present invention, the memory device 230 is a programmable memory device that allows carrier identity information to be written to or erased from the memory in response to a signal from the at least one gateway.

Figure 4:
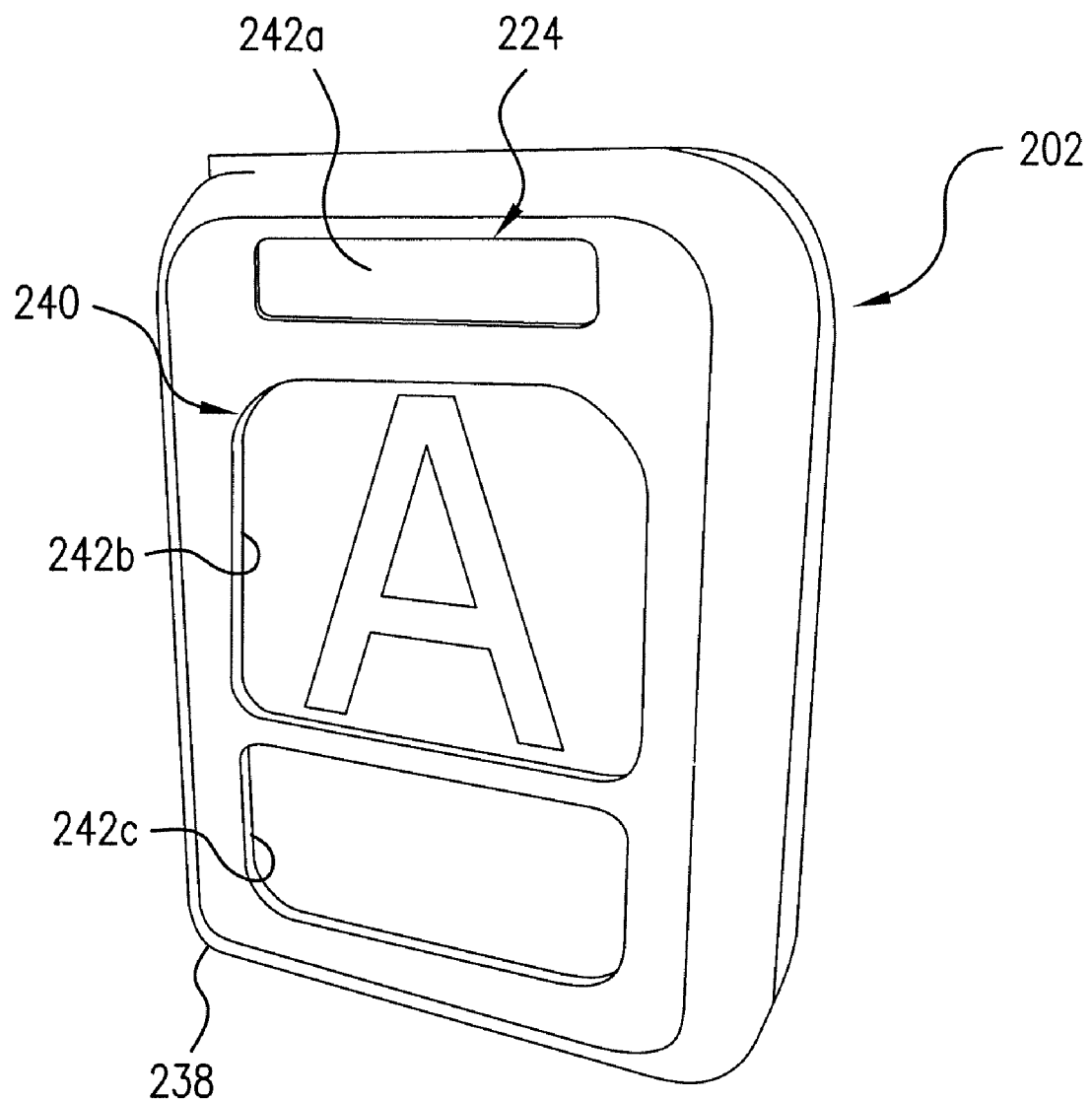
FIG. 4 is a perspective view showing a terminal according to an embodiment of the present invention.

FIG. 4 shows another view of an asset routing terminal 202 according to an embodiment of the present invention. In this view, details of the asset routing terminal housing 238, display 240 and alert mechanism 224 can be seen. In the embodiment shown, the housing 238 is generally rectangular with rounded corners and a plurality of windows 242*a, b* and *c* for the display and the alert mechanism. In an alternative embodiment, the housing 238 may be circular, triangular, hexagonal or any other shape suitable to contain the asset routing components and accommodate the display 240.

In the embodiment shown, the alert mechanism 224 is a light-emitting diode positioned behind a lens in one of the windows 242*a* formed in an upper portion of the housing 238. The light-emitting diode is preferably placed on the upper portion of the asset routing terminal 202 to protrude upwardly from a carrier so the light will be more visible to personnel when carriers are stored in close proximity to one another.

The display 240 is configured to be readable by personnel in the mail sorting facility. Preferably, the display 240 is an electrophoretic display. The electrophoretic display is beneficial because it requires small amounts of power to create and maintain a desired display. In an alternative embodiment of the present invention, the display 240 may use a different display technology such as a liquid crystal display. In an embodiment of the present invention, the terminal includes two display windows 242b and 242c (e.g., the display may be two rectangular displays rather than one large rectangular display). In this embodiment, the display windows 242b and 242c may be dedicated to specific information to facilitate quick identification by workers. In the embodiment shown, one of the display windows 242b is larger than the other display window 242c. The larger window 242b displays the sort group to which the carrier is assigned according to the sort plan. The smaller window 242c displays the identification or delivery point of the mail inside the carrier (e.g., the zip code of the mail) and the destination of the carrier within the facility (e.g., the carrier designated "FSS 1"). The smaller window may also display information about the type of mail, such as preferential (or time sensitive mail, standard mail, or day certain mail). It will be appreciated that the second window can be smaller and not necessarily visible above the carrier because it displays information of a type that is not needed until the carrier is engaged. Preferably, the information is displayed using a font size that fills at least a majority of the available display area to facilitate visual recognition of at least the large display window from a distance in a mail sorting facility.

Figure 5:
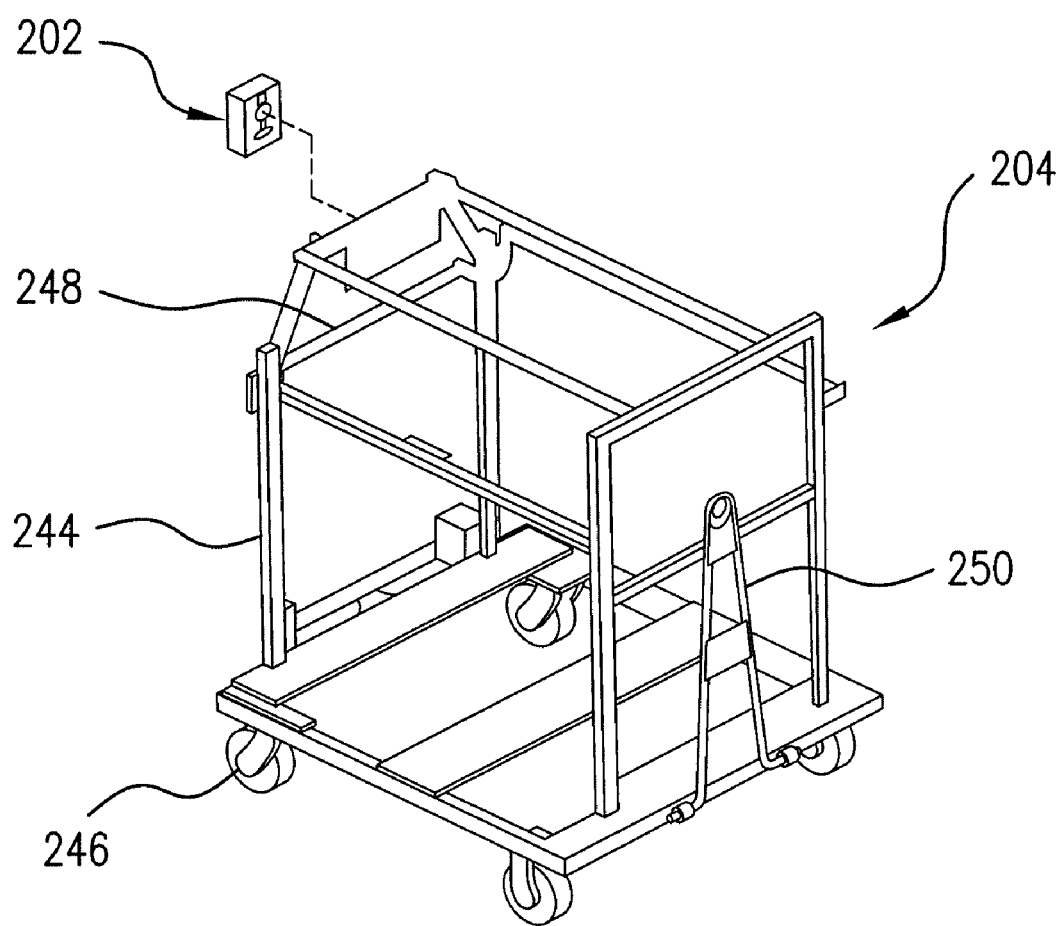
FIG. 5 is a perspective view showing a terminal mount on a mail carrier according to an embodiment of the present invention.

FIG. 5 shows an asset routing terminal 202 mounted on a carrier 204 according to an embodiment of the present invention. The carrier 204 in this embodiment is a dolly including a frame 244 on wheels 246. The frame 244 is configured to hold four stacks of mail trays in a 2×2×3 matrix and includes a handle bar 248 configured to allow personnel to push or pull the dolly around the mail sorting facility. Preferably, the frame is configured to engage with automatic dolly loading and unloading docks. The dolly is also shown with a hitching mechanism 250 to facilitate towing behind a fork lift, or the like.

In this embodiment, the asset routing terminal 202 is placed near the top of the carrier 204 (e.g., on a cross-member) to make it easier for workers to see the terminal when groups of carriers are positioned close to one another. Preferably, the asset routing terminal 202 is mounted such that the alert mechanism protrudes above the top of the carrier 204 to be visible amongst a group of carriers, but the terminal may be placed anywhere on the carrier. In an embodiment, the terminal 202 is fixedly mounted on the carrier 204, e.g., using screws extending through a cross-member into threaded holes formed in the terminal housing. Alternatively, the terminal may be removably mounted to the carrier. Examples of removable mounting mechanisms include hangers, hook and loop fasteners, magnets and/or cradles.

Figure 6:
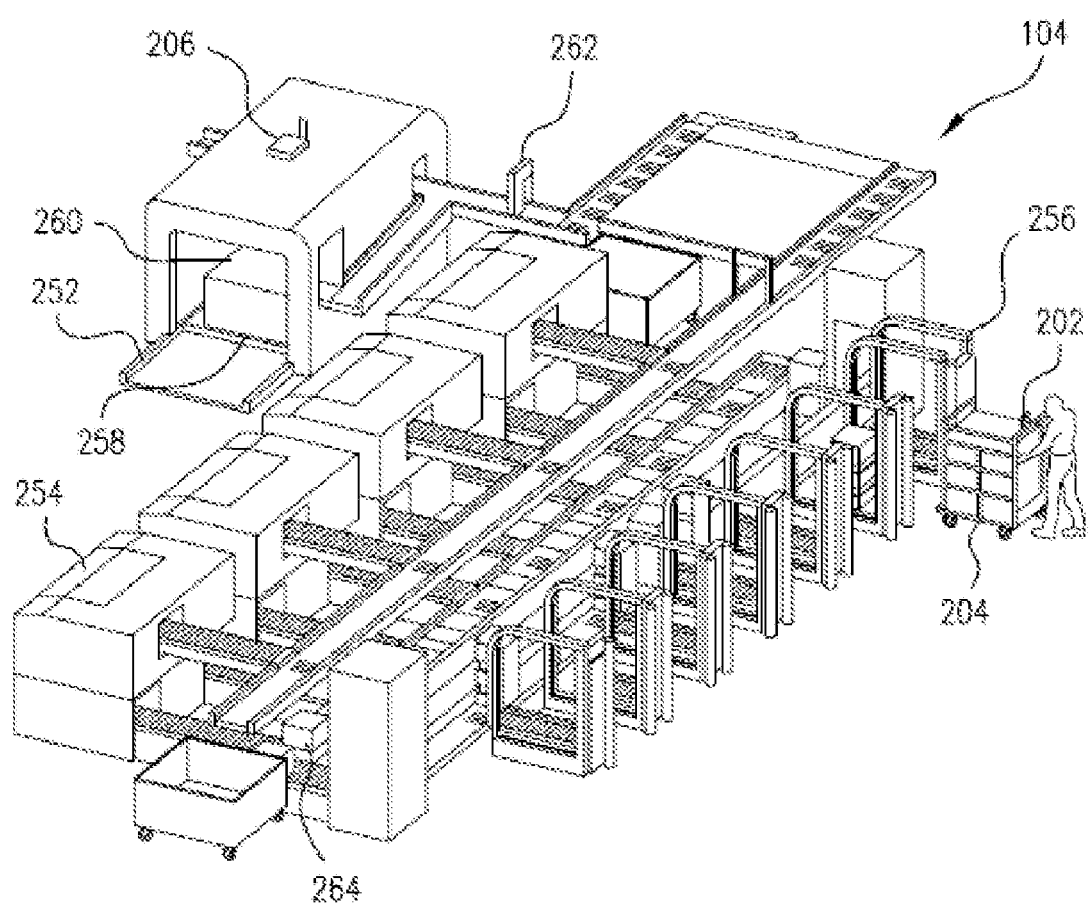
FIG. 6 is a perspective view showing a bulk flats processor using a mail carrier management system according to an embodiment of the present invention.

FIG. 6 shows a bulk flats processor (BFP) 104 modified to include a carrier management system 200 according to an embodiment of the present invention. The BFP 104 is used to show how the carrier management system operates. It will be appreciated that the system 200 operates in a similar manner at the FSS and the other stations in the mail sorting facility.

In operation, mail enters the mail sorting facility 100 via the truck loading dock 102 and is processed by the BFP 104. The BFP 104 includes pallet unloading docks 252, a plurality of tray loading stations 254, and a plurality of dolly loading docks 256. A bundle of mail 260 is unloaded from a pallet 258, scanned at 262, and sent to one of the plurality of tray loading stations 254. The scanner 262 scans at least one piece of mail in the bundle to determine the identification or delivery point of the mail (e.g., zip code, town, state, country, etc.).

The bundle of mail is then placed in an automation compatible tray (ATC) 264. The automation compatible tray has a barcode that is scanned and the server associates the mail with the ATC. The ATC is then sent to a dolly loading dock. The ATC is scanned again at the dolly loading dock 256 prior to being loaded onto the dolly 204. In an embodiment of the present invention, a gateway 206 is placed on or near the dolly dock. The gateway 206 is configured to write information about the identity of the mail in the trays to the asset routing terminal 202 on the dolly.

The mail may already be on or in a carrier, such as pallet 258, when it enters the facility. The mail is then placed in a tray 264 and loaded on a dolly 204 by the BFP 104. Alternatively, the mail may be manually prepared by workers and placed in a tray. The mail is then sent to the FSS where the trays are unloaded for sorting and a signal from the FSS gateway 206 causes the information stored in the asset routing terminal 202 to be erased (indicating an empty dolly). The server then reassigns the dolly 204 and sends instructions to the terminal 202 via FSS gateway 206 so that the terminal displays updated information (e.g., the next destination for the dolly). In the meantime, the FSS sorts the mail until it is ready for dispatch. When the mail is ready for dispatch the mail is placed in dispatch trays, which are then placed in a carrier known as a CASTR cart. In accordance with the present invention, an asset routing terminal 202 may be disposed on each of the carriers 204. The asset routing terminal 202 may contain identification information about the mail in the carrier and the destination of the carrier within the facility.

The server 210 creates and/or executes a sorting plan. The sorting plan dictates where a carrier should be during each phase of the mail sorting operation (e.g., during the second batch of sorting or in one hour). Sort plan information from the server can be transmitted to the asset routing terminal 202 by the gateways 206. The sort plan information can be displayed on the asset routing terminal display.

The asset routing terminal 202 periodically transmits a wireless beacon signal that is received by at least one gateway 206. The at least one gateway (or server) determines a received signal strength. The server determines the location of the asset routing terminal and, thus, the carrier it is mounted on through the at least one received signal strength. The server compares the location of the asset routing terminal to the location required by the sort plan. If the asset routing terminal is in the proper location then no action is taken at that time. If the asset routing terminal is in an incorrect location then the alert mechanism is activated. The location is determined by the server using the received signal strength of at least one gateway. In an embodiment of the present invention, the asset routing terminal is determined to be in the general location of the gateway with the strongest received signal strength. In another embodiment of the present invention, the server uses a plurality of received signal strengths to determine the location of the asset routing terminal through triangulation. In an embodiment of the present invention, the server will use the best-candidate gateways (the three or four gateways with the strongest received signal strength) when locating the terminal through triangulation.

In an embodiment of the present invention, at least one gateway 206 is placed at each of the BFP, FSS and truck dock. For example, a gateway 206 can be mounted on or near the pallet unloading station 252 of the BFP 104 (see FIG. 6). Alternatively, the gateway 206 can be located on or near one or more of the dolly making stations 256 or elsewhere on or around the BFP 104. In an embodiment of the present invention, the gateways 206 at each loading or unloading dock are configured to write identification information to or erase the identification information of the asset routing terminal. The gateways at the locations where mail is loaded into the carriers will write identification information to the asset routing terminal. The gateways at the locations where mail is unloaded from the carriers will erase identification information.

The mail progresses through the various subsystems or stations (e.g., BFP, FSS) following a sort plan. While the mail is being transported between the stations on a carrier with an asset routing terminal mounted on it, the location of the asset routing terminal will be compared to the location required by the sort plan. Anytime a carrier is in an incorrect location the alert mechanism will be activated. If a carrier is stationary for too long than the asset terminal may send a beacon signal to the server requesting instructions. The server may activate the alert mechanism if the carrier has been missed or misplaced.

While specific embodiments have been shown and described, it will be appreciated by those of skill in the art that various modifications can be made without departing from the spirit and scope of the following claims. For example, the asset routing terminal can be configured to allow manual input of carrier identification, the gateways can be mobile or the server at the mail sorting facility can be in communication with servers at other mail sorting facilities so the sort plan for a particular carrier can be passed to other servers. The asset routing terminal can be configured to allow manual input of carrier identification by including a keypad on the terminal. The gateways may be mobile so that workers can use them to write or erase information in an asset writing terminal. Mobile gateways can also help access carriers that may be out of range of stationary gateways. The server at the mail sorting facility may be in communication with other servers via the internet.

From the above, it will be appreciated that the present invention improves the efficiency of a mail sorting facility by monitoring the location of mail carriers and alerting postal employees if a mail carrier is incorrectly located in comparison with a chosen sort plan. While a preferred embodiment of the invention has been described, it will be appreciated that various modifications and changes can be made without departing from the spirit and scope of the invention as set forth in the appended claims.

What is claimed is:

1. A system for managing a plurality of carriers in a mail sorting facility having a plurality of mail handling stations, comprising:
   a server configured to implement a sort plan;
   a plurality of terminals disposed on said plurality of carriers and each configured to send wireless beacon signals, each terminal being respectively disposed on a corresponding carrier;
   said plurality of terminals each including an alert mechanism;
   at least one gateway in communication with said server and configured to receive the wireless beacon signals from said terminals;
   wherein said server is configured to determine the location of a terminal based on the beacon signal transmitted by said terminal to said server via said at least one gateway; and
   wherein said server is further configured to compare the location of each terminal to the location required by the sort plan and to activate the alert mechanism in any terminal determined to be at an incorrect location.

2. The system of claim 1, wherein each of said terminals includes a display system with a display, said display system configured to display information including at least one of carrier identification and sort plan information.

3. The system of claim 2, wherein the sort plan information includes at least one of the zip code of the mail in each carrier and the mail handling station each carrier must go to within the mail sorting facility.

4. The system of claim 2, wherein at least some of said terminals are configured to be mounted on carriers such that said display protrudes physically from said carrier when said terminal is attached thereto.

5. The system of claim 1, wherein said at least one gateway is configured to determine a signal strength of each beacon signal received from a terminal and to provide information about the signal strength to said server.

6. The system of claim 5, wherein said server is configured to determine the location of a terminal based on the signal strength of the beacon signal sent by said terminal.

7. The system of claim 5, further comprising a plurality of gateways and wherein said server is configured to determine the location of a terminal using a plurality of received signal strength readings from said plurality of gateways.

8. The system of claim 1, wherein each of said terminals includes a motion sensor.

9. The system of claim 8, wherein each of said terminals is configured to send a beacon signal after a predetermined period during which said motion sensor senses no motion.

10. The system of claim 8, wherein each of said terminals is configured to continuously send beacon signals while in motion.

11. The system of claim 1, wherein said alert mechanism includes a light-emitting diode.

12. The system of claim 1, wherein said server is configured to send a wireless alert signal to said terminals via said one or more gateways and wherein said alert mechanism of each terminal is configured to be activated in response to an alert signal from said server intended for said corresponding carrier.

13. The system of claim 1, further comprising a plurality of gateways in communication with said server and configured to receive the wireless beacon signals from said terminals, wherein a gateway is present at each mail loading or unloading station.

14. The system of claim 1, wherein said at least one gateway is configured to write information to each terminal.

15. The system of claim 14, wherein said information includes carrier identification information.

16. The system of claim 14, wherein said at least one gateway is configured to erase information on a terminal when the mail in said corresponding carrier has been unloaded.

* * * * *